United States Patent
Oberdörfer et al.

(10) Patent No.: US 12,181,090 B2
(45) Date of Patent: Dec. 31, 2024

(54) ELASTIC PLUG-IN CONNECTOR

(71) Applicant: VOSS AUTOMOTIVE GMBH, Wipperfürth (DE)

(72) Inventors: Alexander Oberdörfer, Radevormwald (DE); Mustapha Ahouri, Lüdenscheid (DE)

(73) Assignee: VOSS Automotive GmbH, Wipperfürth (DE)

( * ) Notice: Subject to any disclaimer, the term of this patent is extended or adjusted under 35 U.S.C. 154(b) by 33 days.

(21) Appl. No.: 18/031,672

(22) PCT Filed: Oct. 11, 2021

(86) PCT No.: PCT/EP2021/078011
§ 371 (c)(1),
(2) Date: Apr. 13, 2023

(87) PCT Pub. No.: WO2022/078941
PCT Pub. Date: Apr. 21, 2022

(65) Prior Publication Data
US 2023/0383882 A1 Nov. 30, 2023

(30) Foreign Application Priority Data
Oct. 13, 2020 (DE) ..................... 10 2020 126 814.9

(51) Int. Cl.
*F16L 53/38* (2018.01)
*F16L 37/088* (2006.01)
*F16L 37/14* (2006.01)

(52) U.S. Cl.
CPC ......... *F16L 37/144* (2013.01); *F16L 37/0885* (2019.08); *F16L 53/38* (2018.01)

(58) Field of Classification Search
CPC ............................. F16L 37/144; F16L 37/0885
See application file for complete search history.

(56) References Cited

U.S. PATENT DOCUMENTS

| | | |
|---|---|---|
| 10,927,992 B2 | 2/2021 | Oberdorfer et al. |
| 11,199,285 B2 | 12/2021 | Hess et al. |
| (Continued) | | |

FOREIGN PATENT DOCUMENTS

| | | |
|---|---|---|
| DE | 10 2009 040 012 A1 | 5/2010 |
| DE | 10 2014 107530 A1 | 12/2015 |
| (Continued) | | |

OTHER PUBLICATIONS

Terada Hidehisa, Quick Connector, Mar. 30, 2017, JP-2017061957-A.*

(Continued)

*Primary Examiner* — Zachary T Dragicevich
*Assistant Examiner* — James A Linford
(74) *Attorney, Agent, or Firm* — Honigman LLP; Eric J. Sosenko; Jonathan P. O'Brien

(57) ABSTRACT

A plug connector for hose and/or pipe connections. The connector includes a base body connected to a receiving body and each has a plug-in channel for a plug part. The connector further includes a retaining part arranged in a receiving opening of the receiving body that, in a locking position, blocks the plug part from being installed. The retaining part includes a stop surface (facing counter to the plug-in direction. The receiving opening has a abutment surface facing in the plug-in direction. During displacement of the retaining part against the plug-in direction, the stop surface acts against the abutment surface of the receiving body. The abutment surface is elastically displaceable against the plug-in direction, at least inside a displacing region. The receiving body has a resistance element which, during displacement of the abutment surface beyond the displacement region, resists further elastic deformation of the receiving body against the plug-in direction.

20 Claims, 9 Drawing Sheets

(56) References Cited

U.S. PATENT DOCUMENTS

2010/0219629 A1* 9/2010 Kerin ................. F16L 37/0885
                                                                              285/319
2018/0328525 A1* 11/2018 Kerin, Jr. ........... F02M 37/0017

FOREIGN PATENT DOCUMENTS

| DE | 10 2016 111 471 A1 | 4/2017 | |
|----|--------------------|--------|---|
| DE | 10 2016 109051 A1  | 4/2017 | |
| EP | 3270028 A2         | 1/2018 | |
| WO | WO-2017067950 A1 * | 4/2017 | ............. F16L 25/01 |
| WO | WO-2020135553 A1 * | 7/2020 | .......... F16L 37/0841 |

OTHER PUBLICATIONS

Alexander Oberdoerfer, Medium Pipe Connector, Nov. 12, 2020 „JP-2020183810-A.*

* cited by examiner

ELASTIC PLUG-IN CONNECTOR

BACKGROUND

1. Field of the Invention

The invention relates to a plug connector for the producing of hose- and/or tube-connections. The plug connector includes a base body and a receiving body. The base body and the receiving body each include a plug-in channel for a plug part to be installed in a plug-in direction. Furthermore, the plug connector includes a retaining part, which is disposed in a receiving opening of the receiving body, and in a locking position blocks the to-be-installed plug part against the plug-in direction. Furthermore, the receiving body is connected to the base body, wherein the retaining part includes a stop surface directed against the plug-in direction. The receiving opening furthermore includes an abutment surface directed in the plug-in direction, wherein during a displacing of the retaining part against the plug-in direction, the stop surface acts against the abutment surface of the receiving part. The receiving body is designed to be elastically deformable such that at least within a displacement region the abutment surface is elastically displaceable against the plug-in direction.

2. Description of Related Technology

Plug connectors of this type are commercially available inter alia as "VOSS QC system 241," and known in particular under the name "SV241N/NSL." Here, usually in a pre-assembly process, the retaining part is plugged into the receiving opening of the receiving body, and the receiving body is installed in the plug-in channel of the base body. After the assembly, i.e., after the plugging-in of the to-be-installed plug part into the plug-in channels of the receiving body and of the base body, the retaining part blocks, at least in an interference-fit manner, a separating of the plug part against the plug-in direction from the plug-in channel of the receiving body and of the base body.

The plug part can in particular be a so-called male plug designed according to the standard SAE J 2044. Here the retaining part engages behind an annular bead formed in the SAE plug contour and blocks it in an interference-fit manner against the plug-in direction.

Such systems are used inter alia in motor vehicle technology. In particular, the use of these systems for fuel systems and "Selective catalytic reduction," hereinafter referred to as SCR systems, is suitable for the reduction of nitrogen oxides in exhaust gases.

SCR systems can be embodied in a known manner both heated and unheated. A 32.5-percent aqueous urea solution, also known as AdBlue, is usually guided within the lines of SCR systems. The composition is regulated in DIN 70070 or ISO 22241-1. It is generally known here that said aqueous urea solutions freeze and expand at temperatures in the range of −8° C. to −11° C. This can lead to a failure of the plug system.

A plug connector of the above-described type is known from DE 10 2016 109 051 A1. For construction reasons this plug connector is designed such that high pressures in the line system or forces act on the plug part, and in turn press it against the retaining element against the plug-in direction. Due to the arrangement of the retaining element in the receiving opening of the receiving body, the force that acts from the plug part on the retaining element is transmitted via the stop surface of the retaining element onto the abutment surface of the receiving opening.

From EP 3 270 028 A2 a plug connector is known in which the receiving body includes a connecting shoulder, which includes freely projecting, radially resilient, axially directed latch arms. Here the latch arms of the receiving body are in operative connection with the base body, so that the receiving body is fixed in the base body in a latching manner.

The plug connectors known from DE 10 2016 109 051 A1 and EP 3 270 028 A2 have proven advantageous in practice. In particular, the constructive design here of the retaining clips with two pairs of spring arms is of great advantage for the assembling and installation security.

However, with plug connectors of the known type, a gap arises between an end, rearmost seen in the plug-in direction, of the plug part, and a wall of the base body opposite this end. In particular, this gap is essential as over-plugging space for the installing of the plug part into the plug connector. In operation, this gap is filled with the medium of the fluid system, in particular with the liquid urea solution. With high operating pressures or when the medium freezes, a force acts against the plug-in direction on the end of the plug part, and thereby displaces it against the plug-in direction. The plug part with its annular bead is thereby pressed against the retaining part, which in turn transmits the force onto the receiving body, in particular as explained in DE 10 2016 109 051 A1. In particular at cold temperatures, the elasticity of the receiving body is present only to a reduced extent, so that the force transmitted onto the receiving body exceeds the elastic range of the receiving body. In particular, plastic deformations and material failure are a possible consequence when the elastic range is exceeded.

SUMMARY

The object underlying the invention is to reduce the disadvantages of the known plug connector, in particular with the known retaining clip, preferably with respect to the resistance against line pressures, while maintaining an at least equivalent function in operation.

The object is inventively achieved by the features of claim 1. Since the receiving body includes a resistance element, which during a displacing of the abutment surface past the displacing region generates a resistance against a further elastic deformation of the receiving body against the plug-in direction, the receiving body preferably includes at least two displacing regions. Here the displacing regions have different-strength resistances against a displacing of the abutment surface. It is advantageous here that due to the elastic deformation of the receiving body, an elastic region is provided that in operation can compensate for pressure pulsation and pressure fluctuations. The resistance element further makes possible a protection against overload, for example, with exceptionally high pressures in operation or a freezing fluid, in particular a fluid freezing in the over-plugging space.

When the pressure in the fluid system increases, the volume for the fluid can quickly be increased using the displacing movement, so that the pressure acting on the plug connector decreases. However, in order to limit the displacing, and in particular to avoid a plastic deformation, the resistance element limits a further displacing of the abutment surface, wherein due to the volume increase made possible, the remaining pressure prevailing in the fluid system is reduced such that it no longer leads to a destruction of the plug connector or of a plastic deforming thereof.

The receiving body is in particular designed as a clip cage. Furthermore, the retaining part is preferably formed as a retaining clip insertable perpendicular to the plug-in direction into the clip cage. Here the retaining clip has in particular a U-shaped profile as viewed in the plug-in direction. The receiving opening in the receiving body is in particular configured complementary to the retaining clip, perpendicular to the plug-in direction in the receiving body, and in particular open on two opposing sides.

In one advantageous embodiment of the invention, the receiving body includes two elastically deformable plate elements, offset parallel to the plug-in direction, and extending in a plane perpendicular to the plug-in direction. In particular, the plate elements here delimit the receiving opening. The frontmost, viewed in the plug-in direction, plate element suitably includes the abutment surface for the stop surface of the retaining part.

In order to adapt the elasticity of the receiving body to the pressure conditions and the use purpose, according to one advantageous embodiment the receiving body includes at least one expansion crosspiece that is designed to be elastically deformable against the plug-in direction and in particular in the plug-in direction. In one advantageous variant of this embodiment, the receiving body includes at least two expansion crosspieces offset around the plug-in channel, wherein the expansion crosspieces are each designed to be elastically deformable against the plug-in direction.

The expansion crosspieces suitably connect the plate elements to each other and are disposed in particular on an outer circumference of the plate elements. Here the plate elements themselves are advantageously elastically deformable, as well as the expansion crosspieces, so that the elastic deformability or the displacing region of the receiving body can be adjusted via the constructive design of the expansion crosspieces and of the plate elements.

In order to further increase the elasticity, according to one embodiment of the invention the receiving body includes at least one material take-out. Material take-offs are to be understood in particular as notches or breakouts or the like, by which a homogenous structure of the receiving body is interrupted. The first and/or the second plate element and/or each of the expansion crosspieces preferably includes at least one such material take-out. In particular, a material take-out can be configured perpendicular and/or parallel to the plug-in direction in the receiving body.

The resistance element is preferably formed as an anvil arm extending in the receiving body parallel to the plug-in direction. In particular, the anvil arm is connected or formed-on at least one-side onto the receiving body in a material-bonded manner, and disposed with at least one end in an anvil receptacle in the receiving body. A gap is suitably formed between a contact section on at least one end of the anvil arm and a correspondingly formed contact surface of the anvil receptacle. With an elastic deforming of the receiving body in the displacing region, or a displacing of the abutment surface, the gap advantageously decreases, i.e., in a manner corresponding to the displacing of the abutment surface, the contact section of the anvil arm approaches the contact surface of the anvil receptacle. In particular, during an abutment contact of the contact section with the contact surface, the resistance element increases the resistance against a further deforming of the receiving body and an associated displacing of the abutment surface against the plug-in direction. The gap between the contact section of the anvil arm and the contact surface of the anvil receptacle can be particularly advantageously adapted to the elastic deformability of the receiving body such that the abutment contact between the contact section of the anvil arm and the contact surface occurs in particular before the displacing of the abutment surface leads to a plastic deformation or a destruction of the receiving body.

According to a further embodiment, at least one anvil arm is connected or formed-on in a material-bonded manner with the receiving body. The anvil arm suitably has a free end formed on the opposite side. In particular, the free end is disposed in the anvil receptacle in the receiving body, wherein the contact section is formed as a protrusion on the free end of the anvil arm.

In particular, the anvil arm is connected to a plate element and extends parallel to the plug-in direction to the respective other plate element. In particular, the respective other plate element includes the anvil receptacle, so that the plate elements are connected to each other via the anvil arm during an abutment contact of the protrusion of the free end and the contact surface of the anvil receptacle.

A further embodiment of the invention provides that the receiving body includes at least two anvil arms and two anvil receptacles. According to this embodiment, these are advantageously configured such that with the achieving of at least two different determined elastic deformations of the receiving body, they come successively into abutment contact, by their respective contact sections, with their respectively associated contact surfaces of the anvil receptacles. The different determined elastic deformations of the receiving body differ in particular by an extent of the elastic displacing of the abutment surface of the receiving body against the plug-in direction. It is advantageously achieved with the achieving of each specific elastic deformation of the receiving body that a further resistance is respectively generated against the displacing of the abutment surface of the receiving body.

According to a further variant, the plug connector suitably includes a return element. The plug-in channel of the receiving body preferably includes an axial plug clearance for the supporting of the plug part to be installed. Here the plug clearance serves in particular to make possible the over-plugging space advantageously acting for the installing of the plug part to be installed. The plug clearance is advantageously delimited by a rear, as viewed in the plug-in direction, stop for an annular bead of the plug part in the plug-in channel of the receiving body, and the retaining part, disposed in front of the rear stop as viewed in the plug-in direction, in the lock position. The return element is suitably disposed at least partially in the receiving body and can generate a return force acting in the plug-in direction on the annular bead of the plug part to be installed. The over-plugging space is thereby advantageously kept as small as possible, so that less fluid, which can freeze and expand, can accumulate in the over-plugging space.

Advantageously for the manufacturing of the plug connector, the receiving body and/or the retaining part and/or the base body are each formed monolithically and produced with the injection molding method. The receiving body and the base body can suitably be connected to each other in a known manner by material bonding, in particular laser welded. Furthermore, in a modular-as-possible embodiment, alternatively to a material-bonded connection the receiving body and the base body can be connected to each other by friction- or friction-interference-fit in an also-known manner by latch elements, in particular latch arms formed parallel to the plug-in direction.

Further advantageous designs of the invention arise from the following Figure description and the dependent sub-claims.

BRIEF DESCRIPTION OF THE DRAWINGS

In the various Figures of the drawings identical parts are always provided with the same reference numbers.

DETAILED DESCRIPTION

For the subsequent description, it asserted that the invention is not limited to the exemplary embodiments, and is not limited here to all or multiple features of feature combinations described, rather, each individual partial feature of the/of each exemplary embodiment is also of significance for the subject matter of the invention, separate from all other partial features thus described in connection thereto, in itself and also in combination with any features of a different exemplary embodiment.

Figure 1:
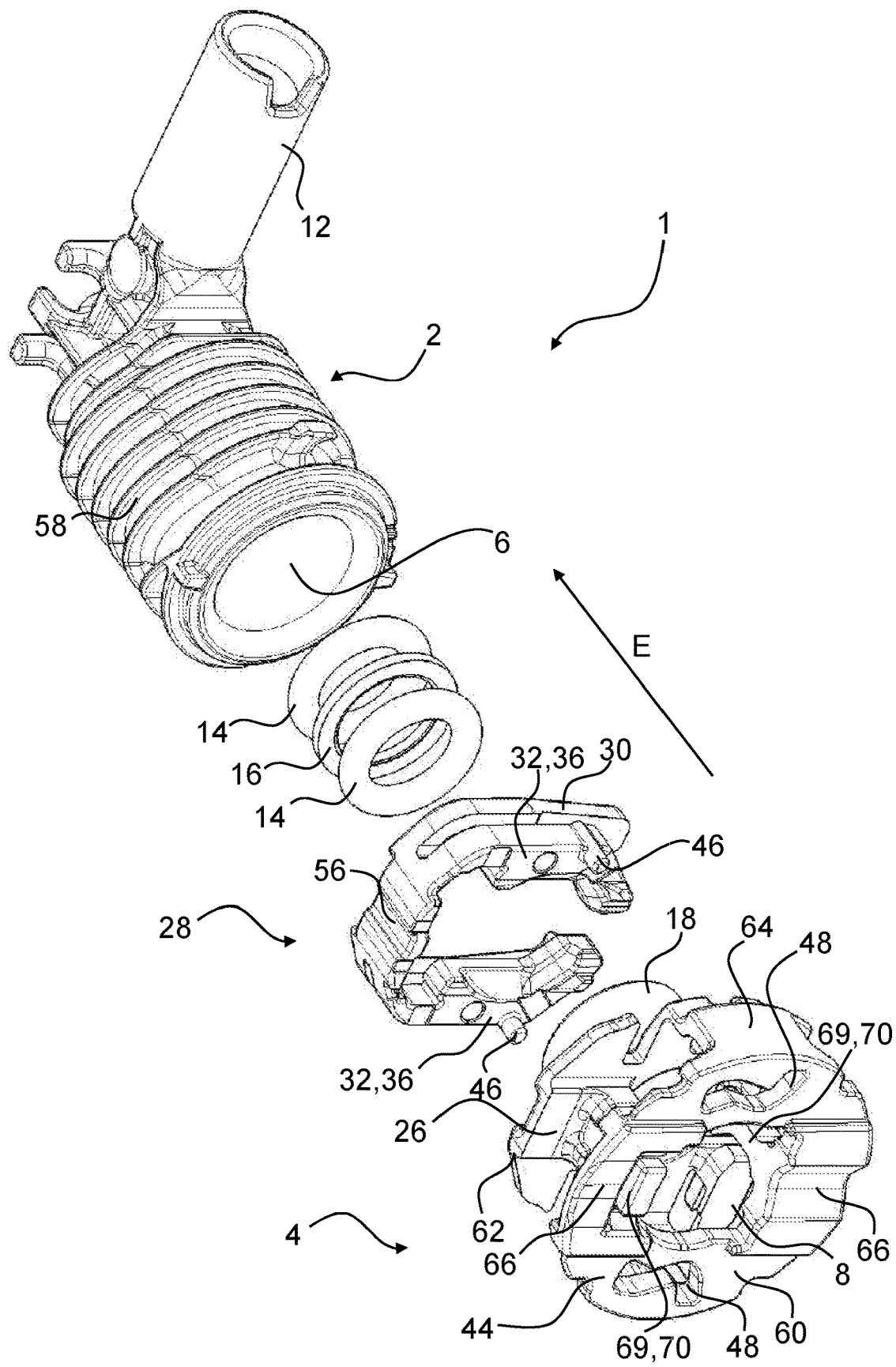
FIG. 1 shows an exploded view of an embodiment of an inventive plug connector.
Figure 6:
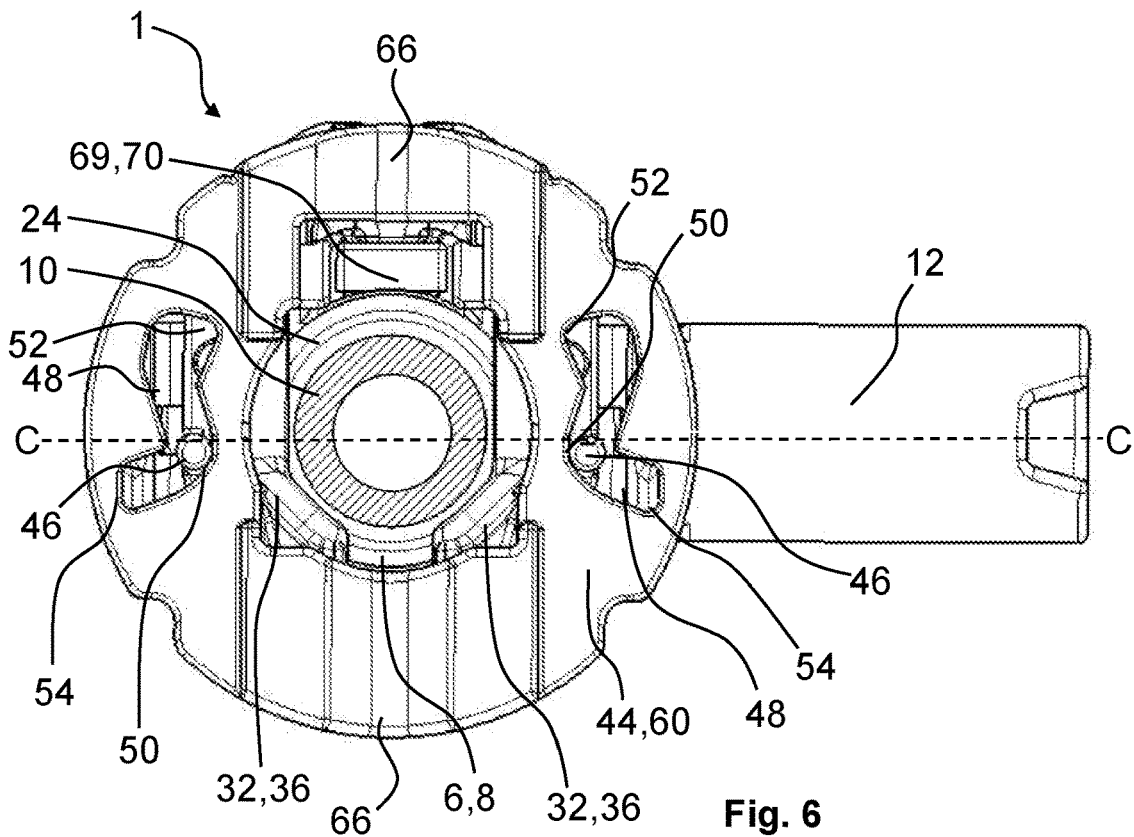
FIG. 6 shows a view in the plug-in direction of an embodiment of the inventive plug connector with a plugged-in plug part.
Figure 7:
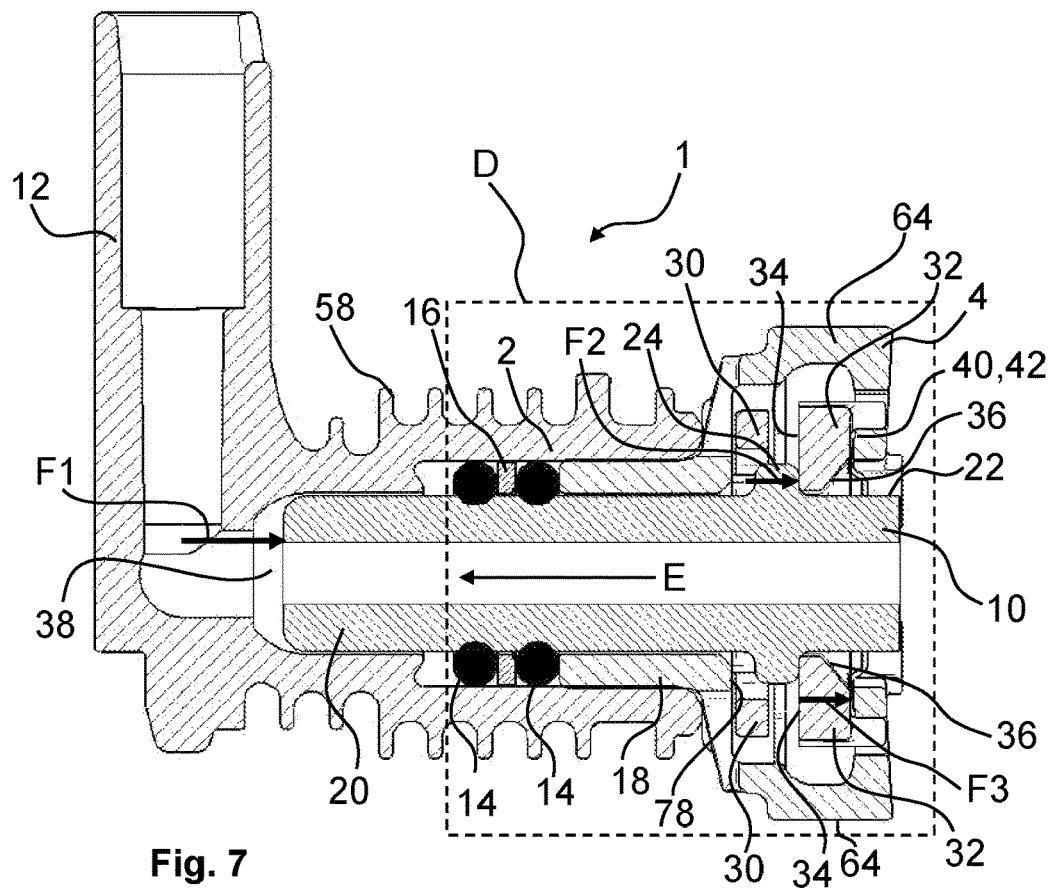
FIG. 7 shows a sectional view along C-C according to FIG. 6.
Figure 8:
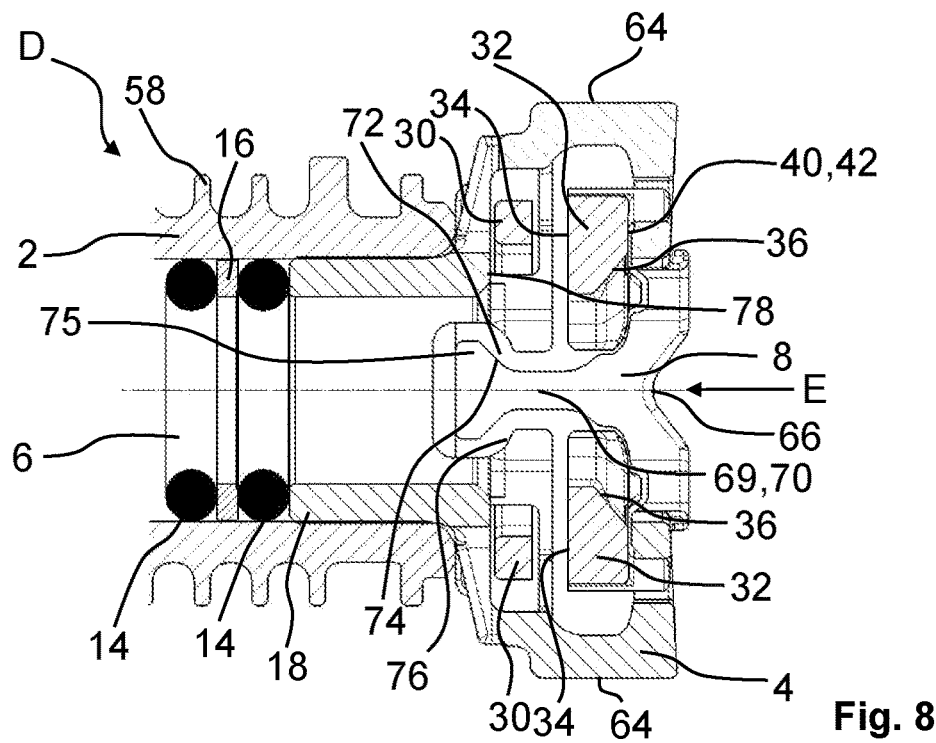
FIG. 8 shows a detail view of the region D of the sectional view according to FIG. 8 without plugged-in plug part.

As depicted in FIG. 1, for the producing of hose and/or tube connections, the plug connector 1 includes a base body 2 and a receiving body 4. As can be seen in FIGS. 7 and 8, the base body 2 and the receiving body 4 each include a plug-in channel 6, 8 for a plug part 10 to be installed in a plug-in direction E. The plug part 10 is depicted for clarity in FIGS. 6 and 7. In FIGS. 1 to 16, the receiving body 4 is depicted in an embodiment advantageously configured as clip cage.

The base body 2 can in particular be connected to a fluid line not depicted. For this purpose a terminal section 12 is preferably formed on the base body 2, as depicted in FIGS. 1, 6, and 7. A media line to be connected can be configured in particular as a hose or tube. It can be provided that the fluid line is connected in an interference- and/or friction-fit manner, or also in a material bonded manner. Furthermore, the base body 2 can be connected directly to an assembly or another element of a fluid line system.

In the plug-in channel 6 of the base body 2, a seal package can be disposed that preferably comprises two seal rings 14, in particular elastomeric O-rings, and a spacer ring 16 therebetween.

This seal package preferably abuts against a connecting shoulder 18, facing in plug-in direction E, of the receiving body 4, or against a support ring. The advantageous embodiment with the support ring is not depicted. Due to the support ring, which, like the spacer ring, is composed of a firmer material than the O-rings, a gap extrusion of the elastomeric O rings is counteracted. Here the seal package suitably seals an outer circumference of a seal section of the plug part 10 to be installed, after its installation, against an inner wall of the plug-in channel 6 of the base body 2.

The plug part 10 is in particular an SAE J 2044 male plug. As depicted by way of example in FIG. 7, the plug part 10 is configured to be hollow-cylindrical and in particular includes the seal section 20 and a locking section 22 disposed in front of the seal section 20 in plug-in direction E. In a plugged-in state, the seal section 20 is preferably disposed entirely in the plug-in channel 6, 8 of the base body 2 and of the receiving body 4. In particular, the seal section 20 is separated from the locking section 22 by an encircling annular bead 24 increased in diameter.

The plug connector 1 features a retaining part 28, depicted in FIG. 1, in particular configured as retaining clip in the depicted exemplary embodiment; the retaining part 28, as depicted in FIGS. 6 to 8, is disposed in a receiving opening 26 of the receiving body 4. In accordance with the depiction according to FIGS. 6 and 7, in a lock position the retaining part 28 blocks the to-be-installed plug part 10 against the plug-in direction E.

The receiving body 4 is in particular designed as a clip cage. The retaining part 28 configured as retaining clip is preferably insertable into the clip cage perpendicular to the plug-in direction E. Here the retaining part 28 configured as a retaining clip has in particular a U-shaped profile as viewed in plug-in direction E. The receiving opening 26 in the receiving body 4 is in particular configured complementary to the retaining clip perpendicular to the plug-in direction E in the receiving body 4, and in particular open on two opposite sides, in particular the receiving opening 26 includes an entry opening and an exit opening.

The retaining part 28 is suitably pre-installable in the receiving opening 26 of the receiving body 4. Here the retaining part 28 configured as a retaining clip can preferably assume at least two positions, a releasing position and a locking position, in particular three positions, namely in addition a pre-assembly position. In the not depicted releasing and pre-assembly positions, the plug part 10 to be installed is insertable into the plug-in channel 6, 8 through the retaining clip. In particular, at least in the releasing position, the plug part 10 is removable from the plug-in channel 6, 8 against the plug-in direction E. Preferably in the locking position the retaining clip, in accordance with FIG. 7, locks the plug part 10 in an interference-fit manner in that the retaining clip blocks the annular bead 24 of the plug part 10 against a movement against the plug-in direction E.

In particular, as depicted in FIG. 1, the retaining part 28 configured as a retaining clip includes two pairs of spring arms. A pair of the spring arms suitably consists respectively of a position arm 30 and a functional arm 32. In particular, viewed in plug-in direction E, the position arms 30 are each disposed behind the respective functional arm 32.

Here the functional arms 32 and position arms 30 are each disposed opposite each other radially with respect to the plug-in channel 6, 8. The position arms 30 are advantageously configured as retainers, and in a pre-assembly position of the retaining clip engage behind a position element, which is formed in the receiving opening 26.

The functional arms 32 include in particular a blocking side 34, preferably formed perpendicular to the plug-in channel 6, 8, facing in the plug-in direction E, and an insertion side 36, facing against the plug-in direction E and at least regionally chamfered. The insertion side 36 is chamfered such that during the plugging-in of the plug part 10 to be installed, the insertion side 36 with the chamfered section comes into abutment contact with the annular bead 24 of the plug part 10, and the functional arms 32 are elastically deformed outward radially with respect to the plug-in channel 6, 8. The blocking side 34 is configured such that as soon as the plug part 10 is plugged in so far in the plug-in channel 6, 8 in plug-in direction E that the annular bead 24 of the plug part 10 is disposed behind the functional arm 32 in plug-in direction E, the functional arm 32 reverts back to its original shape radially with respect to the plug-in channel 6, 8, and with the blocking side 34 blocks the annular bead 24 in an interference-fit manner against the plug-in direction E.

The plug part 10 is advantageously plugged-in so far in plug-in direction E into the plug-in channel 6, 8 of the base body 2 and of the receiving body 4 until the annular bead 24 is engaged-behind by the functional arm 32. With this assembly method, a so-called plugging-over, i.e., an excessive, with respect to the actual latch position, plugging-in of the plug part 10 in plug-in direction E, in order to make possible the engaging-behind of the retaining part 28, is advantageous.

In this regard, the rearmost, in the plug-in direction E, section of the plug-in channel 6 of the base body 2 forms an over-plugging space 38 depicted in FIG. 8.

As depicted in FIGS. 1 to 3, 6, 9, 10, and 16, guide slots can advantageously be located on an end wall 44, facing against the plug-in direction E, of the receiving body 4; the guide slots are for the engaging of complementary guide pins 46 depicted in FIGS. 1 and 6. The guide pins 46 are formed on the functional arms and protrude from these against the plug-in direction E.

The guide slots are each suitably configured as slots 48 with bend angles, whereby the slots 48 form a control contour for the guide pins 46. Due to the interaction of the control contour with the guide pins 46, an insertion movement and a pushing-out movement of the retaining part 28, configured as a retaining clip, perpendicular to the plug-in direction E, is advantageously constructively limited, and a movement of the functional arms 32 radially with respect to the plug-in channel 6, 8 is controlled. At least one pre-assembly position, a releasing position, and a locking position of the retaining clip in the receiving opening 26 can advantageously be set by the control contour. In the locking position, the guide pins 46 are disposed in a locking contour 50 of the control contour, which locking contour 50 is located between a pre-assembly contour 52 and a release contour 54. The locking contour 50, the control contour, and the release contour 54 are connected to one another by the slot 48.

By a radial pressure from outside the plug connector 1 onto a release surface 56 of the retaining clip, or from a pressure inside the plug connector 1 on the insertion side 36 of the functional arms 32 during the plugging-in of the to-be-installed plug part 10 into the plug-in channel 8 of the receiving body 4, the retaining clip is transferable from the locking position into the releasing position by the guide pins 46 of the functional arms 32 following the control contour of the slots 48.

In the pre-assembly state the guide pins 46 are disposed in particular in the pre-assembly contour 52. From the pre-assembly position, the retaining clip is advantageously transferable by a radial pressure, from outside the plug connector 1 onto the release surface 56 of the retaining clip, or from a pressure inside the plug connector 1 onto the insertion side 36 of the functional arms 32 during plugging-in of the to-be-installed plug part 10 into the plug-in channel 8 of the receiving body 4, into the locking position, by the guide pins 46 of the functional arms 32 following the control contour of the slots 48.

As depicted in FIGS. 7 and 8, the receiving body 4 is connected to the base body 2. Furthermore, it is depicted in FIGS. 7 and 8 that the retaining part 28 includes a stop surface 40 facing against the plug-in direction E. Facing the stop surface 40, the receiving opening 26 includes an abutment surface 42 facing in the plug-in direction E. Here, as depicted in FIG. 8, with a displacing of the retaining part 28 against the plug-in direction E, the stop surface 40 acts against the abutment surface 42 of the receiving body 4. Here the receiving body 4 is designed to be elastically deformable such that the abutment surface 42 is elastically displaceable against the plug-in direction E, at least within a displacing region.

According to a not-depicted embodiment, the plug connector 1 and/or the fluid line connected to the plug part 10 to be installed can be configured to be electrically heated. For the heating of the plug connector 1, a heating means is advantageously disposed on the base body 2 and/or the receiving body 4, in particular wound around the base body 2 and/or the receiving body 4. The heating means is preferably configured as an electrical heating means, in particular as a single- or multiple-wire heating wire or heating conductor.

As depicted in FIGS. 1, 7, and 8, the base body 2 suitably includes a heating section in which the heating means is disposed. In particular, in the heating section the base body 2 includes at least one guide element 58 for the guiding and directing of the heating means. According to one preferred embodiment, the guide element 58 is a helical guide groove that extends in a spiral shape around the circumference of the base body 2.

According to the invention, as depicted in FIGS. 1 to 6 and 8 to 14, the receiving body 4 includes a resistance element 69. During a displacing of the abutment surface 42 beyond the displacing region, the resistance element 69 generates a resistance against a further elastic deformation of the receiving body 4 against the plug-in direction E.

Due to the inventive embodiment, the receiving body 4 suitably includes at least two displacing regions. Here the displacing regions have different-strength resistances against a displacing of the abutment surface 42. It is advantageous here that due to the elastic deformation of the receiving body 4, an elastic region is provided that in operation can compensate for pressure pulsation and pressure fluctuations. Accordingly the resistance element 69 provides a resistance region for protecting against an overload, for example, by a deformation beyond the displacing region.

In the inventive sense, the displacing region is not a limitation of the elastic region. In particular, the receiving body 4 can also be elastically deformable beyond the displacing region. However, the receiving body 4 is not plastically deformable by a displacing of the abutment surface 42 against the plug-in direction E within the displacing region.

The receiving body 4 or the abutment surface 42 of the receiving body 4 is deformed beyond the displacing region in particular with exceptionally high pressures in operation or a freezing fluid, in particular a fluid freezing in an over-plugging space 38, depicted in FIG. 7.

When a fluid freezes in the plug connector 1, this fluid expands and increases its volume. A releasing force acting on a front end of the plug part 10 against the plug-in direction E is thereby exerted on the plug part 10; see first releasing force F1 in FIG. 7. The plug part 10 in turn transmits the releasing force through its interference-fit connection against the plug-in direction E with the annular bead 24 onto the retaining part 28, in particular onto the blocking side 34 of the functional arms 32; see second releasing force F2 in FIG. 7. According to the invention, the retaining part 28 is disposed in the receiving opening 26, and thereupon transmits the releasing force via the stop surface 40 onto the abutment surface 42 of the receiving opening 26, whereby the receiving body 4 is deformed or the abutment surface 42 is displaced; see third releasing force F3 in FIG. 7.

When the pressure in the fluid system increases, the volume for the fluid can quickly be increased using the displacing movement, so that the pressure acting on the plug connector 1 decreases. However, in order to limit the displacing, and in particular to avoid a plastic deformation, the resistance element 69 limits a further displacing of the abutment surface 42, wherein due to the volume increase made possible, the remaining pressure prevailing in the fluid system is reduced such that it no longer leads to a destruction of the plug connector 1 or of a plastic deforming thereof.

In particular, according to the advantageous embodiments depicted in FIGS. 1 to 5, 9 to 14, and 16, the receiving body 4 includes two plate elements 60, 62 offset parallel to the plug-in direction E and each extending in a plane perpendicular to the plug-in direction E. The plate elements 60, 62 are in particular elastically deformable and delimit the receiving opening 26. The frontmost, as viewed in plug-in direction E, first plate element 60 suitably includes the abutment surface 42 for the stop surface 40 of the retaining part 28. Furthermore, the frontmost, as viewed in plug-in direction E, first plate element 60 includes in particular the control contour or the slots 48 for the guiding of the guide pins 46 of the retaining clips.

According to a further advantageous embodiment, the receiving body 4 includes at least one expansion crosspiece 64, in particular two expansion crosspieces 64 displaced around the plug-in channel 6, 8. Here the expansion crosspieces 64 are suitably configured to be elastically deformable against the plug-in direction E, and in particular in the plug-in direction E.

In particular, the advantageous embodiments depicted in FIGS. 1 to 16 include the expansion crosspieces 64. Here the expansion crosspieces 64 optimize the elasticity of the receiving body 4 in the manner that the elasticity can be adapted to or is adapted to the pressure conditions and the use purpose. Particularly advantageously the expansion crosspieces 64 limit, as depicted, the receiving opening 26 as viewed radially toward the plug-in channel 6, 8.

In FIGS. 1 to 5, 7 to 14, and 16, advantageous embodiments are also depicted, according to which the expansion crosspieces 64 connect the plate elements 60, 62 to each other. In particular, the expansion crosspieces 64 are disposed here on an outer circumference of the plate elements 60, 62. Here the plate elements 60, 62 are advantageously elastically deformable, as well as the expansion crosspieces 64, so that the elastic deformability or the displacing region of the receiving body 4 can be adjusted via the constructive design of the expansion crosspieces 64 and the plate elements 60, 62.

The receiving body 4 advantageously includes at least one material take-out 66. The material take-out 66 is in particular configured as a notch or a breakout or a constriction or the like. The material take-out 66 increases the elasticity or the deformability of the receiving body 4, and reduces the resistance against the plug-in direction E. Due to the material take-outs 66, in particular a homogenous structure of the receiving body 4 is interrupted. In particular the first and/or the second plate element 60, 62 and/or each of the expansion crosspieces 64, as depicted in FIGS. 9 to 14 and 16, include at least one such material take-out 66. In particular, a material take-out 66 can be configured perpendicular and/or parallel, as depicted in FIGS. 13 to 16, to the plug-in direction E in the receiving body 4. Particularly advantageously in the embodiment of the receiving body 4 depicted in FIGS. 13 to 16, the connection of the plate elements is optimized in order to adapt the force-displacement curve to possible requirements. Furthermore, due to the material take-outs 66 formed parallel to the plug-in direction E, the receiving body 4 is advantageously particularly stable and also simple to manufacture.

Figure 11:
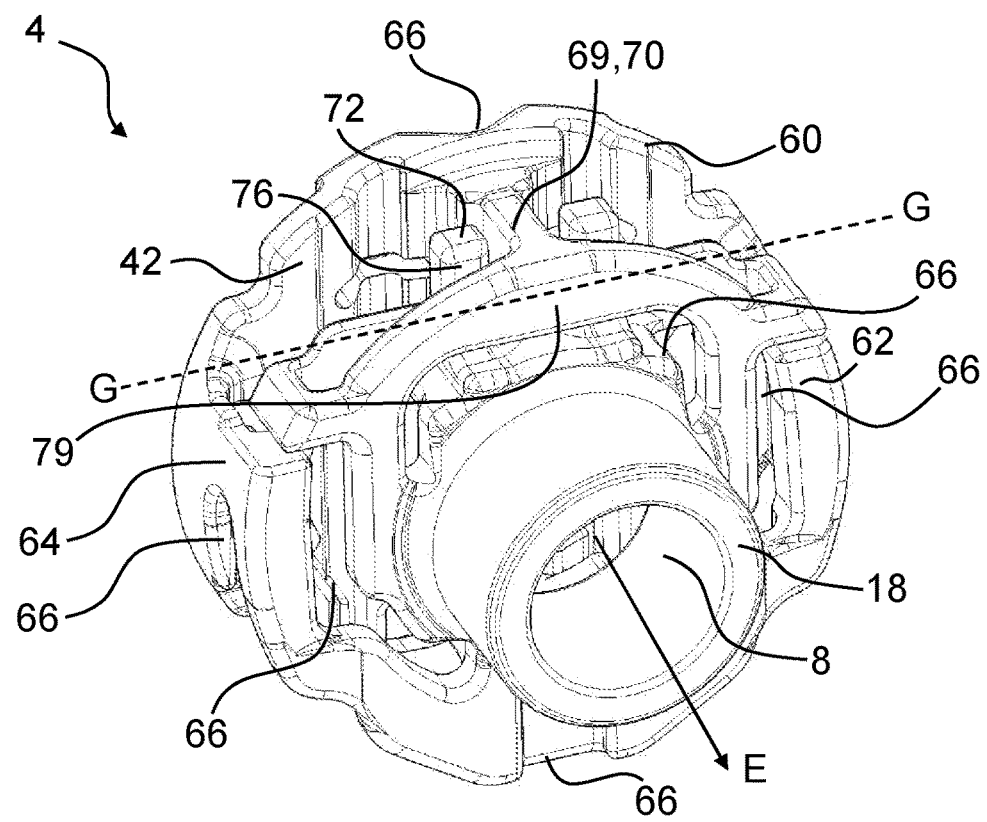
FIG. 11 shows a perspective view of a side, facing in the plug-in direction, of the second embodiment of the receiving body.
Figure 12:
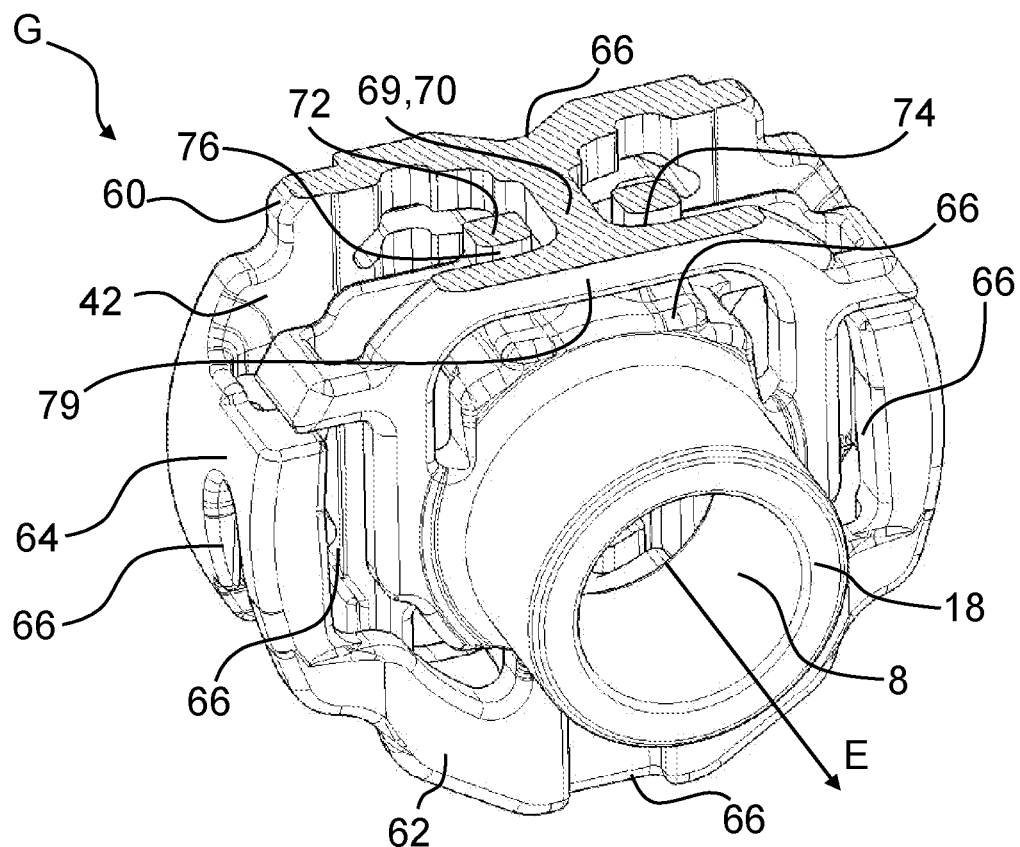
FIG. 12 shows a perspective sectional view of a section surface G-G according to FIG. 11.
Figure 13:
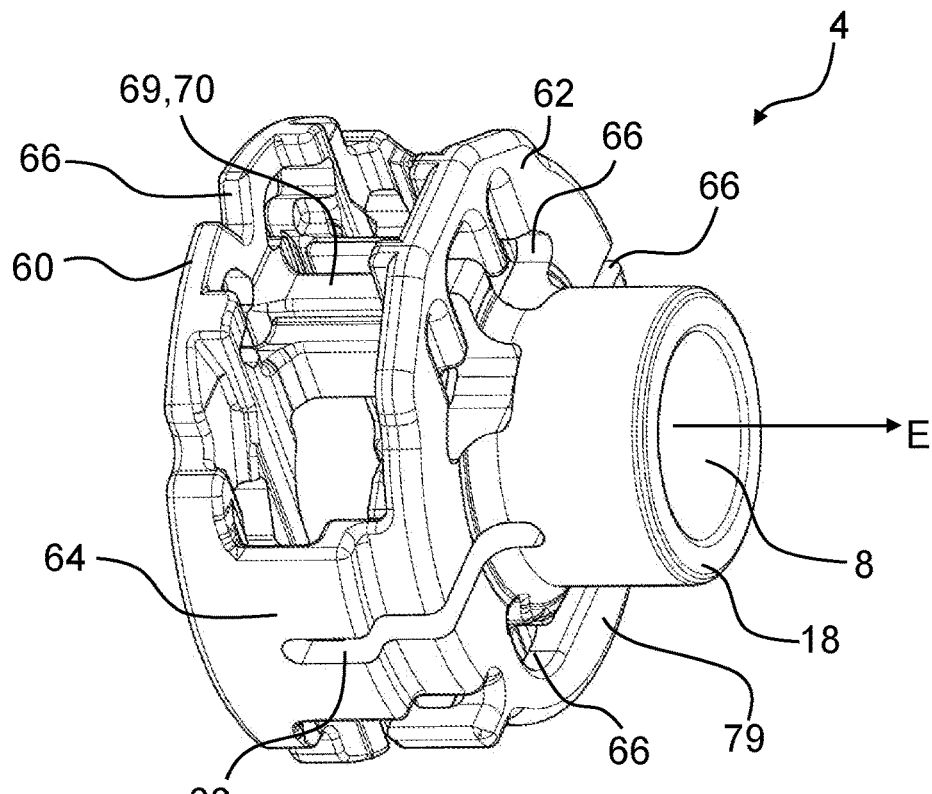
FIG. 13 shows a perspective side view of a third embodiment of a receiving body.

The material take-outs can also suitably be configured tangential to a circular path around the plug-in channel 8 of the receiving body, as depicted in particular in FIGS. 11 and 12 in the second plate element 62.

In particular in FIGS. 3, 5, 6, 9 to 12, and 16, a material take-out 66 configured as a notch, which is formed on the end wall 44 of the first plate element 60 or on the back side 68, facing in the plug-in direction, of the second plate element 62, is depicted. Furthermore, in FIGS. 4, 5, 11 to 15, material take-outs 66 are advantageously formed as breakouts, in particular slots, which are formed in the second plate element 62. As depicted in FIGS. 9 to 16, the material take-out 66 is particularly advantageously configured in the form of breakouts, in particular free punches, in the expansion crosspieces 64.

As depicted in FIGS. 1 to 6, 8, 7, and 9 to 14, the resistance element 69 is preferably configured as an anvil arm 70 extending in the receiving body 4 parallel to the plug-in direction E. The anvil arm 70 is advantageously connected or formed-on one-side with the receiving body 4 in a material-bonded manner, and disposed with its free end in an anvil receptacle 72 in the receiving body 4.

As depicted in FIG. 8, the contact section 74 is in particular configured on a protrusion 75 on a free end of the anvil arm 70. In particular, a gap is formed between the contact section 74 of the protrusion 75 and a correspondingly formed contact surface 76 of the anvil receptacle 72. With a deforming of the receiving body 4, in particular with the displacing of the abutment surface 42 against the plug-in direction E, the anvil arm 70 is dragged along by its material-bonded connection, whereby the gap decreases.

Advantageously, when the contact section 74, in particular the protrusion 75, is in abutment contact with the contact surface 76, the resistance element 69 increases the resistance against a further deforming of the receiving body 4 against the plug-in direction E.

Particularly advantageously the gap between the contact section 74, in particular of the protrusion 75, the anvil arm 70, and the contact surface 76 of the anvil receptacle 72 can be adapted to the elastic deformability of the receiving body 4 such that the abutment contact occurs between the contact section 74 of the anvil arm 70 and the contact surface 76, in particular before the displacing of the abutment surface 42 leads to a plastic deformation or a destruction of the receiving body 4.

According to the embodiment in FIGS. 9 to 14, at least one anvil arm 70 is advantageously connected to the plate elements 60, 62 on both sides.

At least one anvil arm 70 connected to the plate elements 60, 62 is suitably configured one-side with a protrusion 75 forming the contact section 74. Here the end including the protrusion 75 is advantageously radially to the plug-in channel 6, 8 connected to the plate element 60, 62 by a connecting crosspiece 77. This embodiment of the anvil arm 70 can be seen in FIG. 9.

Figure 9:
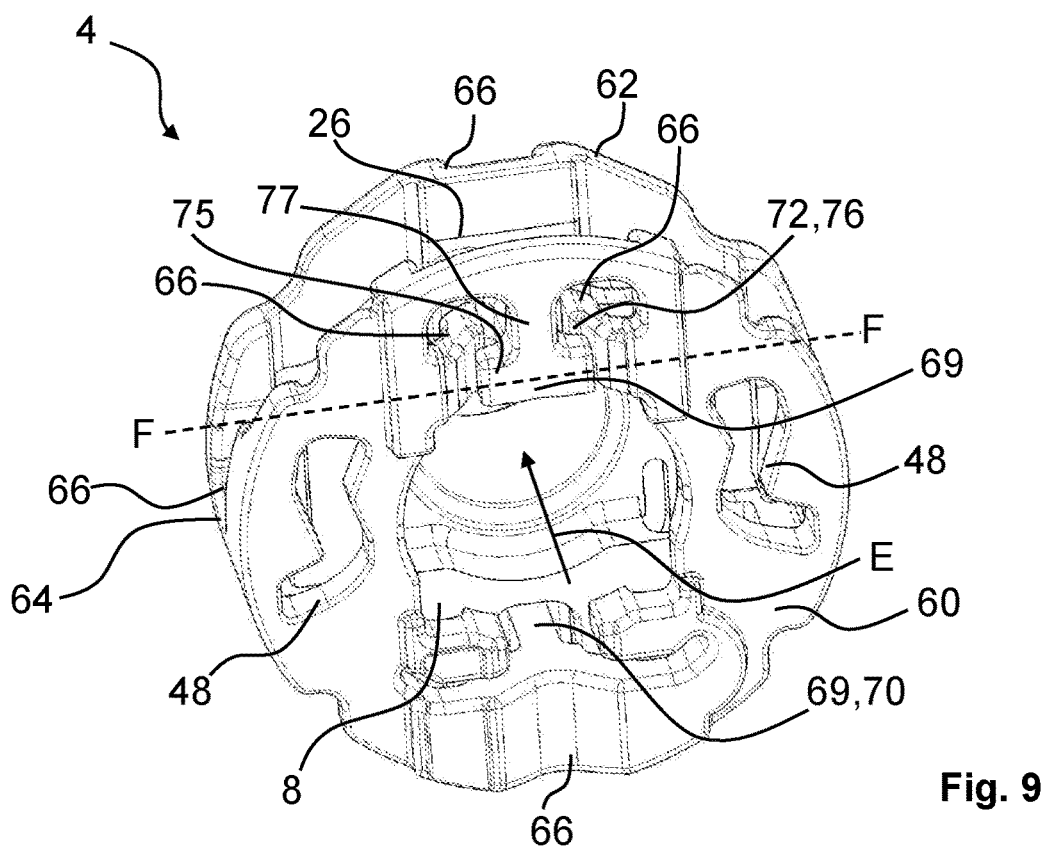
FIG. 9 shows a perspective view of a side, facing away from the plug-in direction, of a second embodiment of a receiving body.
Figure 10:
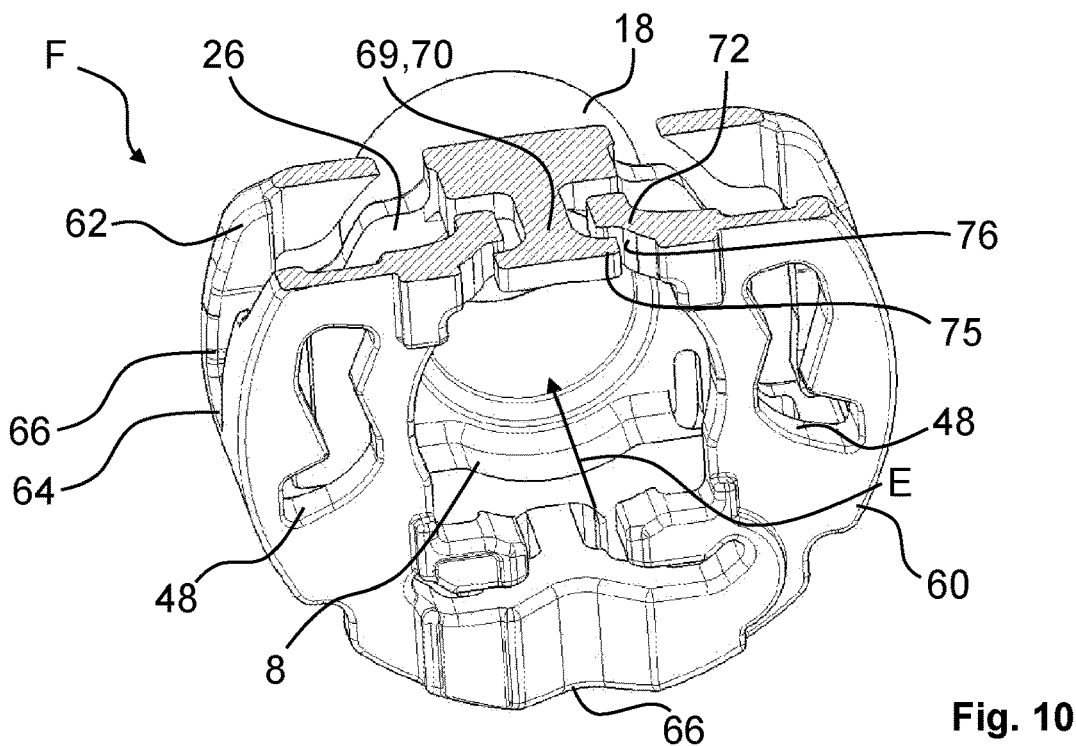
FIG. 10 shows a perspective sectional view of a section surface F-F according to FIG. 9.
Figure 16:
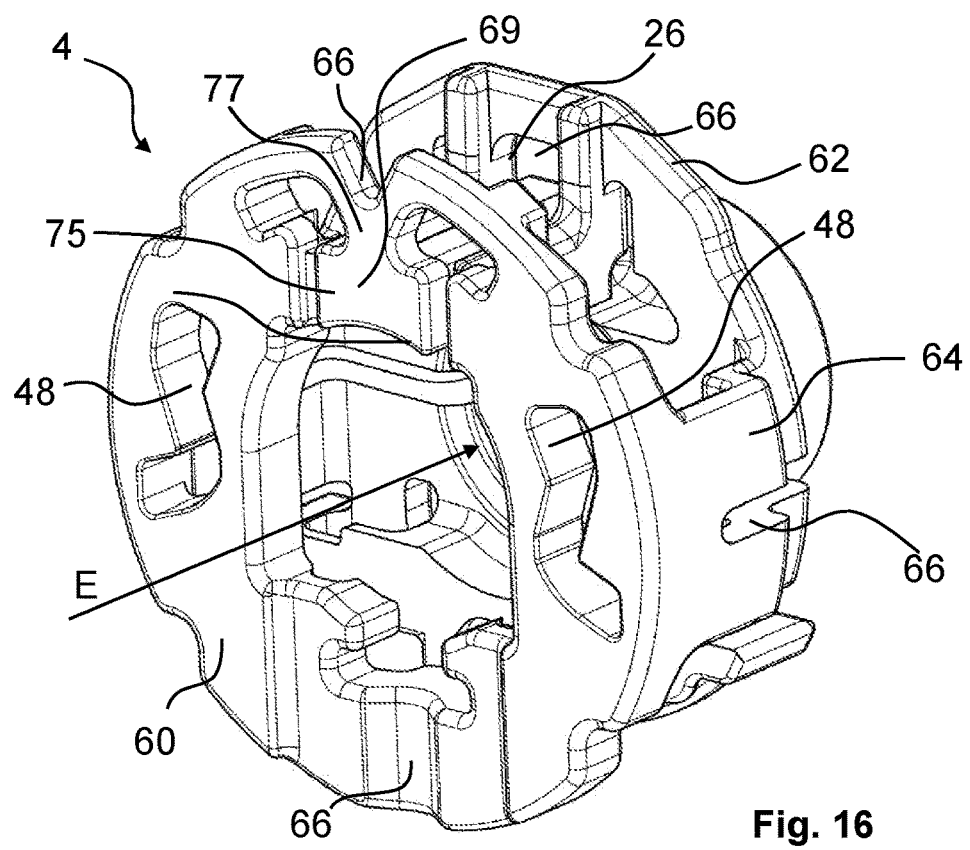
FIG. 16 shows a perspective view of a side, facing against the plug-in direction, of the third embodiment of the receiving body according to FIG. 13.

As depicted in FIGS. 9 and 16, viewed in the circumferential direction with respect to the plug-in channel 6, 8, material take-outs 66 are particularly advantageously configured adjacent to the connecting crosspiece 77 in the plate element 60.

Figure 14:
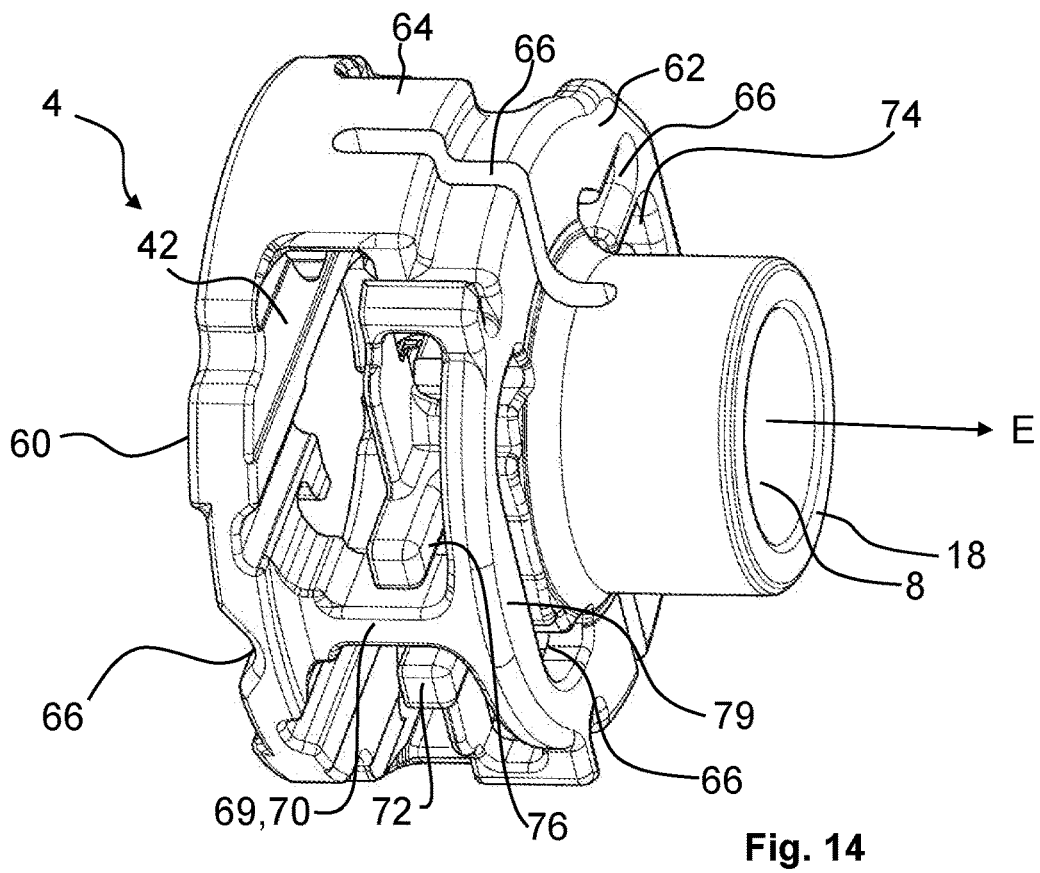
FIG. 14 shows a perspective side view, rotated by 90°, of the third embodiment of the receiving body according to FIG. 13.

FIGS. 12 and 14 show a further embodiment of the receiving body, wherein at least one anvil arm 70 connected on both sides to the plate elements 60, 62 is connected to the plate element 60, 62 such that the contact section 74 is configured as a part of the plate element 62 itself. According to this embodiment, the anvil arm 70 advantageously merges into the plate elements 60, 62 on both sides such that the anvil arm 70 extends out from a surface of the respective plate element 60, 62, facing toward the receiving opening 26 or delimiting the receiving opening 26. In this embodiment, in order to support the elasticity and the force of the plate elements 60, 62 required for a displacing, the region of the plate element 60, 62 into which the anvil arm 70 merges with its contact sections 74 is configured as an expansion crosspiece 79, as depicted in FIGS. 11, 12, 14, and 15.

Figure 15:
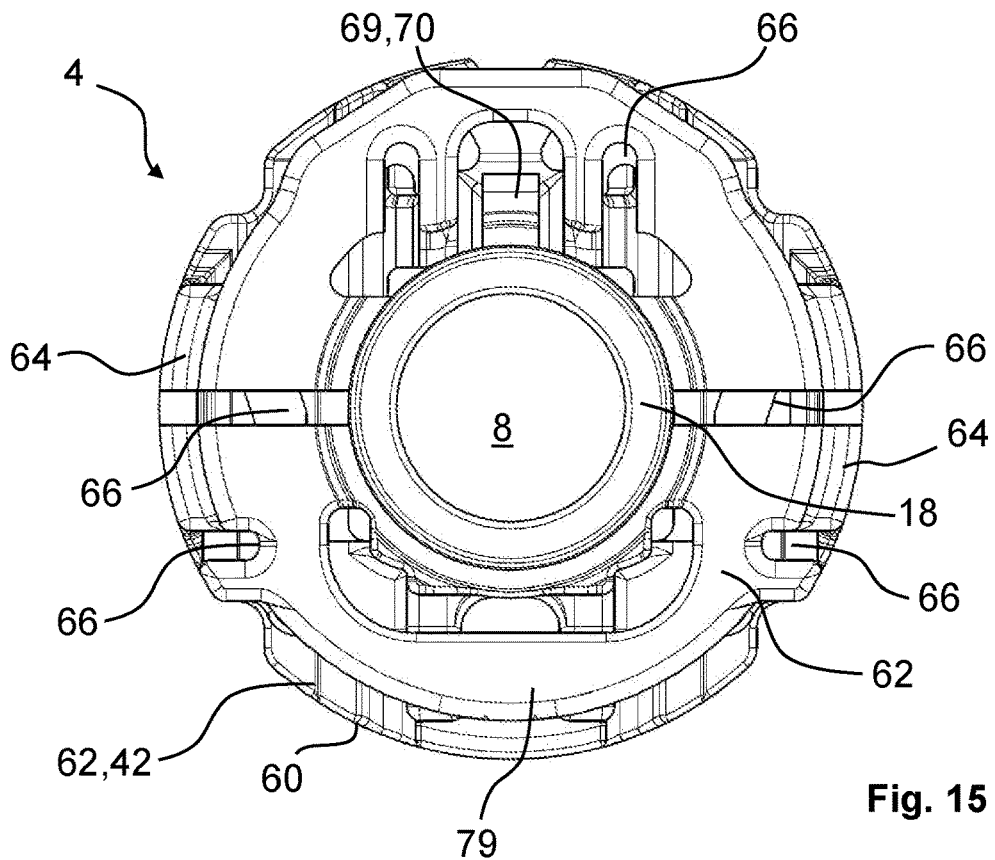
FIG. 15 shows a view of a side, facing in the plug-in direction, of the third embodiment of the receiving body according to FIG. 13.

A material take-out 66 in the form of an axial breakout in the plate element 60, 62, in FIGS. 12, 14, and 15 in the second plate element 62, is advantageously formed displaced radially with respect to the expansion crosspiece 79 toward the plug-in channel 6, 8 and over the arc section of the expansion crosspiece 79. With an axial displacing of the abutment surface 42, the expansion crosspiece together with the anvil arm 70 connected to it is suitably displaced against the plug-in direction E.

Figure 5:
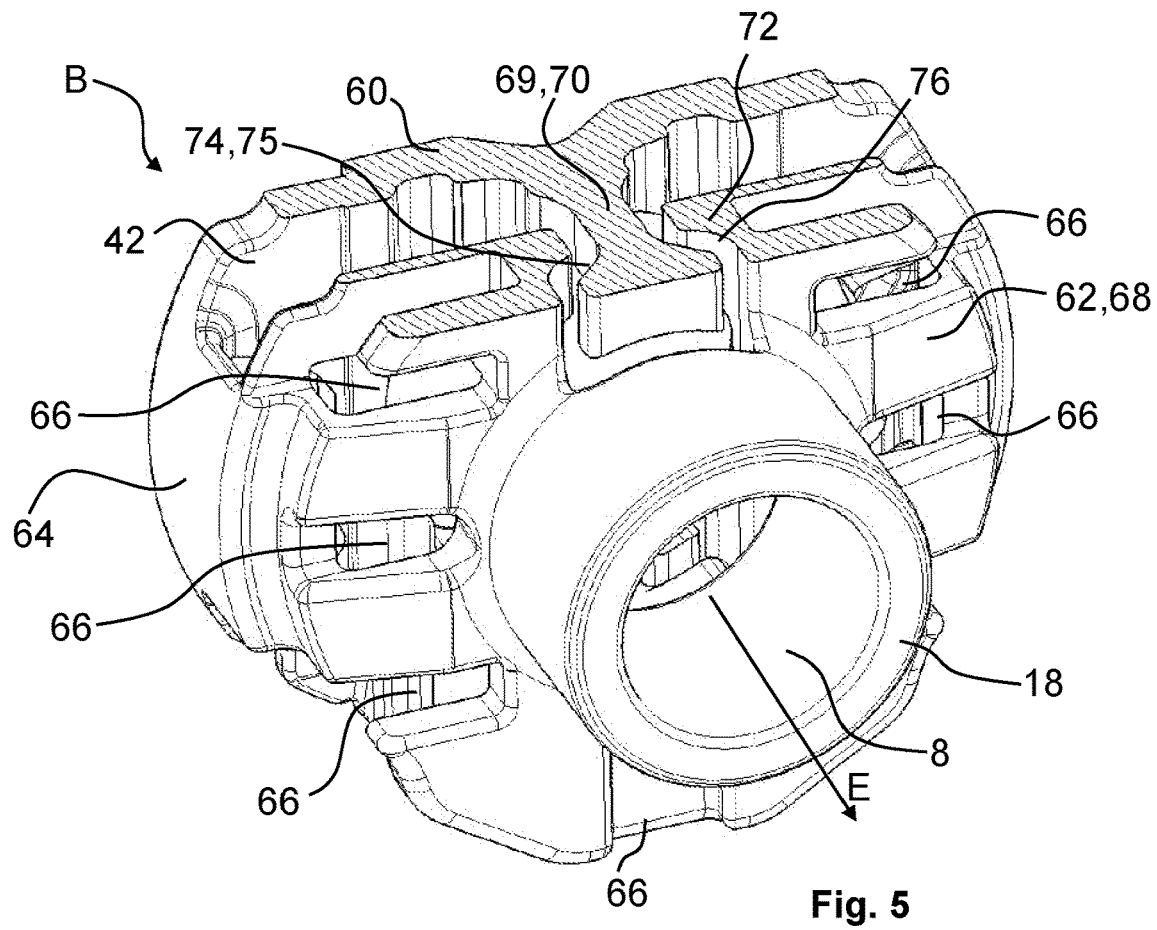
FIG. 5 shows a perspective sectional view of a section surface B-B according to FIG. 4.

In FIGS. 2 to 5 and 8, a further embodiment of the anvil arm 70 or of the at least one anvil arm 70 is depicted. Here at least one anvil arm 70 is advantageously connected, or formed-on, in a material-bonded manner one-side to the receiving body 4, in particular to a plate element 60, 62. The end of the anvil arm 70 opposite the material-bonded connection is suitably configured as a free end. As depicted in FIG. 5, the free end is in particular disposed in the anvil receptacle 72 in the receiving body 4. To increase the resistance against an axial displacing of the abutment surface 42, the contact section 74 is preferably configured as a protrusion 75 on the free end of the anvil arm 70. Here the protrusion 75 or the contact section 74 is configured in particular in accordance with the protrusion 75 or the contact section 74 of the embodiment in FIG. 10.

In particular, at least one of the plate elements 60, 62 has at least one anvil arm 70, connected or formed-on in a materially bonded manner, extending parallel to the plug-in direction E and to the respective other plate element 60, 62. This embodiment is depicted in particular in FIGS. 1 to 6, 8, and 10 to 14. Here the corresponding anvil receptacle 72 is advantageously disposed in the respective other plate element 60, 62. To increase the resistance against a deformation or displacing against the plug-in direction E, with an abutment contact of the contact section 74 of the anvil arm 70 and the contact surface 76 of the anvil receptacle 72 the plate elements 60, 62 are suitably connected to each other via the anvil arm 70.

To adjust the resistance that results from the anvil arm 70, the anvil arm 70 itself and/or the anvil receptacle 72 can be designed to be elastically deformable against the plug-in direction E.

In the respective plate element 60, 62 the anvil receptacle 72 advantageously forms a material take-out 66 that in turn increases the elasticity against the plug-in direction E and reduces the resistance. According to a preferred embodiment, a material take-out 66, respectively configured as a notch, is formed in each plate element 60, 62, radially of the plug-in channel 6, 8, and opposite the anvil receptacle 72 in the plate element 60, 62. In particular, FIGS. 1 to 7, 9 to 12, and 16 show a corresponding advantageous embodiment.

In the advantageous embodiment, the receiving body 4 includes two or more anvil arms 70 and corresponding anvil receptacles 72. In one advantageous embodiment, the receiving body 4 includes two anvil arms 70 and two anvil receptacle 72. The anvil receptacles 72 and anvil arms 70 are preferably disposed distributed uniformly about the plug-in channel 6, 8. In particular, two anvil arms 70 and anvil receptacles 72 and disposed diametrically with respect to the plug-in channel 6, 8.

According to a further alternative embodiment, the at least two anvil arms 70 and two anvil receptacles 72 are configured such that upon reaching the specific deforming of the receiving body 4, they simultaneously come into abutment contact by their respective contact sections 74 with their respective associated contact surfaces 76 of the anvil receptacles 72. Particularly advantageously a resistance is thereby generated directly, starting with the reaching or exceeding of the displacement path. Such an embodiment is characterized in particular by two resistance regions, advantageously a first resistance region in which the receiving body 4 or its deforming is located in the displacing region, and a second resistance region, from the extent of the displacing of the abutment surface 42 on which the anvil arms 70 come into abutment contact by their respective contact section 74 with their respective associated contact surfaces 76 of the anvil receptacles 72.

A further advantageous embodiment of the invention also relates to a receiving body 4 that includes at least two anvil arms 70 and two anvil receptacles 72. The anvil arms 70 and anvil receptacles 72 are advantageously configured such that upon reaching at least two different specific elastic deformations of the receiving body 4, they come successively into abutment contact by their respective contact sections 74 with their respective associated contact surfaces 76 of the anvil receptacles 72. It is advantageously achieved that with the reaching of each specific elastic deforming of the receiving body 4, a further resistance is respectively generated against the displacing of the abutment surface 42 of the receiving body 4, so that the resistance against the plug-in direction E increases in a stepwise manner. The various specific elastic deformations of the receiving body 4 differ in particular by an extent of the elastic displacing of the abutment surface 42 of the receiving body 4 against the plug-in direction E. A plug connector 1 of this type advantageously includes the first resistance region, in which the receiving body 4 or its deforming is located in the displacing region, and furthermore at least one second and third resistance region, at which the anvil arms 70 come into abutment contact by their respective contact sections 74 with their respective associated contact surfaces 76 of the anvil receptacles 72.

Figure 2:
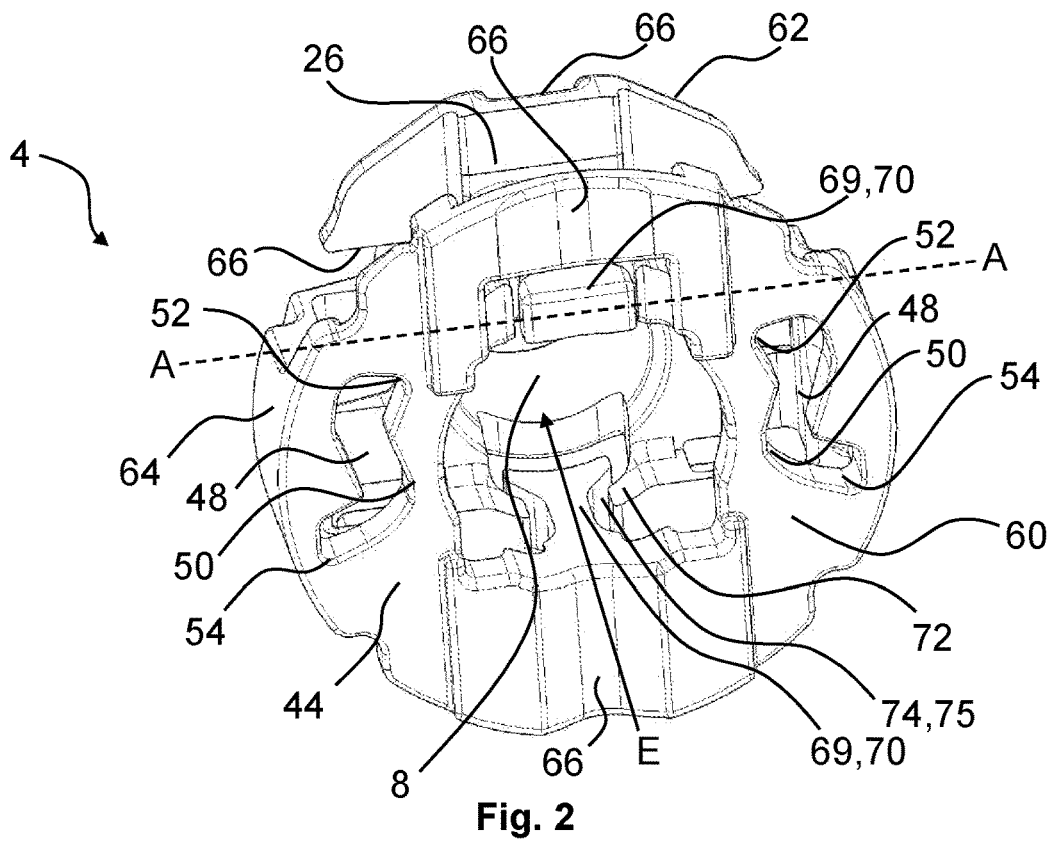
FIG. 2 shows a perspective view on a side, facing against a plug-in direction, of a first embodiment of a receiving body.
Figure 3:
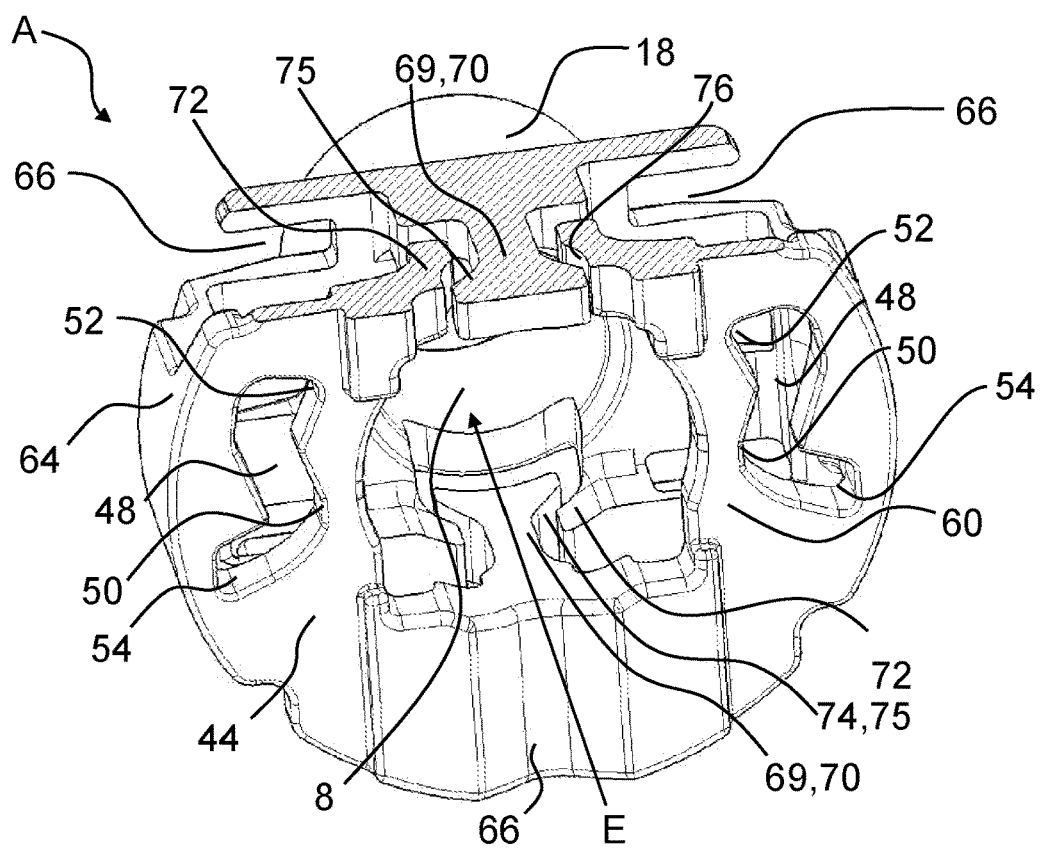
FIG. 3 shows a perspective sectional view of a section surface A-A according to FIG. 2.
Figure 4:
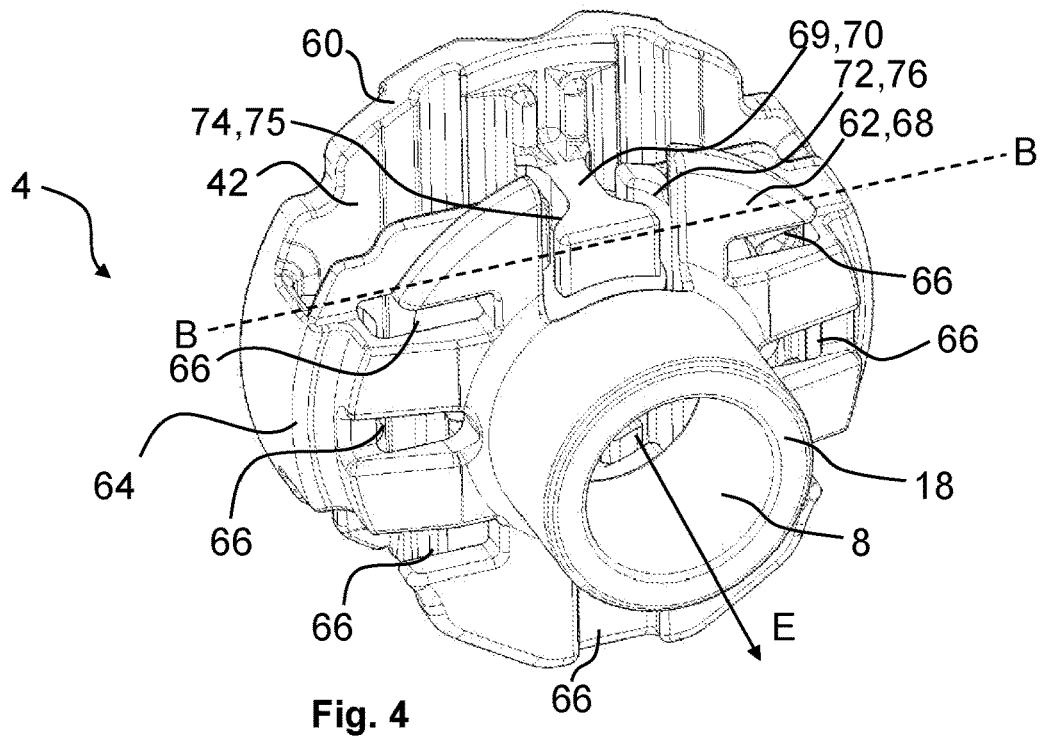
FIG. 4 shows a perspective view of a side, facing in the plug-in direction, of the first embodiment of the receiving body.

At least one anvil arm 70 is suitably configured with its free end facing in plug-in direction E, and at least one anvil arm 70 is suitably configured with its free end facing against the plug-in direction E. This embodiment is depicted in FIGS. 1, 2, and 3 and makes possible an adapting of the component manufacturing to existing tool conditions. According to the embodiment depicted in the mentioned Figures, the anvil arm is disposed on the first, frontmost, as viewed in plug-in direction E, plate element 60, and extends into the anvil receptacle 72 of the second, rearmost, as viewed in plug-in direction E, plate element 62. Diametrically opposite the plug-in channel 6, 8, the anvil arm 70 is disposed on the second plate element 62 and extends into the anvil receptacle 72 of the first plate element 60.

According to a further advantageous embodiment, which is depicted in particular in FIGS. 9 to 12, at least one anvil arm 70 connected on both sides to the plate elements 60, 62 is configured with the protrusion 75 on at least one side. Here the end, including the protrusion 75, of the anvil arm 70 is suitably connected by the connecting crosspiece 77 to the plate element 60, 62 radially with respect to the plug-in channel 6, 8. Furthermore, in this advantageous embodiment at least one further anvil arm 70 connected on both sides to the plate elements 60, 62 is configured connected to the plate elements 60, 62 such that the contact section 74 itself is configured as a part of the plate element 60, 62.

In a not-depicted further variant, the plug-in channel 8 of the receiving body 4 advantageously has an axial plug clearance for the supporting of the plug part 10 to be installed. The plug clearance serves in particular for the over-plugging of the plug part 10 during its installing. The plug clearance is preferably limited by a rearmost, as viewed in plug-in direction E, stop 78 for the annular bead 24 of the plug part 10 in the plug-in channel 8 of the receiving body 4, and the retaining part 28, in front of the rearmost stop 78 as viewed in the plug-in direction E, in the locking position. Here a return element is suitably disposed at least partially in the receiving body 4 and can generate a return force acting in plug-in direction E on the annular bead 24 of the plug part 10 to be installed. The over-plugging space 38 is thereby advantageously kept as small as possible, so that less fluid, which can freeze and expand, can accumulate in the over-plugging space 38.

For a particularly advantageous manufacturing, the receiving body 4 and/or the retaining part 28 and/or the base body 2 are configured monolithically and manufactured in the injection molding method.

For the purpose of a particularly high loadability, according to one advantageous embodiment the receiving body 4 and the base body 2 are connected to each other in material-bonded manner, in particular laser welded. Alternatively, for the purpose of simplified repairs and or adjustments, the receiving body 4 and/or of the base body 2 can have latch- and/or screw-elements with which the base body 2 and the receiving body 4 are connected to each other. In particular when the base body 2 is unreleasably, for example, connected to an assembly, an embodiment of the base body 2 and receiving body 4, which embodiment is separable from the base body 2, is advantageous.

Below an assembly example is described with an advantageous embodiment of a plug connector 1 with a base body 2 and a receiving body 4.

For the pre-assembling of the plug connector 1, first the seal package is inserted into the base body 2.

Subsequently the receiving body 4 is brought together with the base body 2, and in particular connected in a material-bonded manner.

Then the retaining part 28, in particular the retaining clip, is inserted, perpendicular to the plug-in direction E, in the receiving opening 26 of the receiving body 4, so that initially the pre-assembly state arises in which the guide pins 46 of the functional arms 32 engage into the complementary guide slots. In the pre-assembly position, the guide pins 46 are disposed in the pre-assembly contour 52, and the position elements engage-behind into the receiving opening 26 of the position arms. The plug connector 1 can be delivered in this state.

Alternatively, possibly even preferably, the receiving body 4 can also be preinstalled already before the connecting to the base body 2 with the retaining part, in particular the retaining clip.

In the later final assembly the plug part 10 is introduced into the plug-in channel 6, 8 in plug-in direction E. Here during passing of the retaining part 28, the annular bead 24 of the plug part 10 contacts in particular the insertion side 36 of the functional arm 32. The functional side is preferably configured such that the retaining clips are drawn in radially deeper into the receiving opening 26 before a radial widening of the functional arms 32, and consequently radially elastically widened. Thereafter the functional arms 32 can finally latch-in behind the annular bead 24 and block a movement of the plug part 10 against the plug-in direction E by their blocking side 34.

To release the plug connection, the retaining clip is displaced deeper into the receiving opening 26 by pressing on its release surface 56. The guide pins 46 in the guide contour of the guide slots are thereby displaced radially outward into the release contour 54. Consequently, the functional arms 32 are widened so that due to the widening of the functional arms 32, the annular bead 24 is released again. The connection can now be released by the plug part 10 being pulled from the plug connector 1 against the plug-in direction E.

The invention is not limited to the exemplary embodiments shown and described, but rather also comprises all embodiments which work the same way in the sense of the invention. It is emphasized that the exemplary embodiments are not limited to all features in combination, rather each individual partial feature can also have inventive significance in isolation from all other partial features. Furthermore, the invention is so far not yet limited to the combinations of features defined in claim 1, but rather can also be defined by any other combination of specific features of all of the individual features disclosed. This means that in principle practically any individual feature of claim 1 can be removed or replaced by another individual feature disclosed elsewhere in the application.

The invention claimed is:

1. A plug connector for the producing of hose- and/or tube-connections, including a base body and a receiving body, which each include a plug-in channel for a plug part to be installed in a plug-in direction, furthermore including a retaining part, which is disposed in a receiving opening of the receiving body and, in a locking position, block the to-be-installed plug part against the plug-in direction, wherein the receiving body is connected to the base body, wherein the retaining part includes a stop surface facing against the plug-in direction, wherein the receiving opening includes an abutment surface facing in the plug-in direction, wherein with a displacing of the retaining part against the plug-in direction, the stop surface acts against the abutment surface of the receiving body, wherein the receiving body is designed to be elastically deformable such that the abutment surface is elastically displaceable against the plug-in direction at least inside a displacing region, wherein the receiving body includes a resistance element which, during a displacing of the abutment surface beyond the displacing region, generates a resistance against a further elastic deforming of the receiving body against the plug-in direction, wherein the resistance element is configured as an anvil arm extending in the receiving body parallel to the plug-in direction, which is connected or formed-on in a material-bonded manner at least one-side with the receiving body, and is disposed with at least one end in an anvil receptacle in the receiving body, wherein between a contact section on at least one end of the anvil arm and a correspondingly configured contact surface of the anvil receptacle a gap is formed that decreases with a displacing of the abutment surface, and with an abutment contact of the contact section with the contact surface increases the resistance against a further deforming of the receiving boy against the plug-in direction.

2. The plug connector according to claim 1, wherein the receiving body includes two elastically deformable plate elements offset parallel to the plug-in direction and each extending in a plane perpendicular to the plug-in direction, wherein the plate elements delimit the receiving opening.

3. The plug connector according to claim 1, wherein the receiving body includes at least one expansion crosspiece displaced around the plug-in channel, and the at least one expansion crosspiece is configured elastically deformable against the plug-in direction, and radially restricts the receiving opening.

4. The plug connector according to claim 3, wherein the expansion crosspieces connects the plate elements to each other and is disposed on an outer circumference of the plate elements.

5. The plug connector according to claim 1, wherein the receiving body includes at least one material take-out, that increases the elasticity of the receiving body.

6. The plug connector according to claim 1, wherein at least one anvil arm (70) is connected to the plate elements on both sides.

7. The plug connector according to claim 6, wherein that at least one anvil arm connected on both sides with the plate elements is configured one-side with a protrusion forming the contact section, wherein the end including the protrusion is connected radially to the plug-in channel by a connecting crosspiece to the plate element.

8. The plug connector according to claim 6, wherein at least one anvil arm connected to the plate elements on both sides is configured connected to the plate element such that the contact section is configured as a part of the plate element itself.

9. The plug connector according to claim 1, wherein at least one anvil arm is connected or formed-on in a material-bonded manner with the receiving body and has a free opposite end, which is disposed in the anvil receptacle in the receiving body, wherein the contact section is configure as a protrusion on the free end of the anvil arm.

10. The plug connector according to claim 1, wherein at least one of the plate elements has at least one anvil arm, connected or formed-on in a material-bonded manner, extending parallel to the plug-in direction and to the respective other plate element, and the corresponding anvil receptacle is disposed in the respective other plate element.

11. The plug connector according to claim 10, wherein the receiving body includes two anvil arms and anvil receptacles that are disposed diametrically with respect to the plug-in channel.

12. The plug connector according to claim 1, wherein the receiving body includes two or more anvil arms and corresponding anvil receptacles that are disposed distributed uniformly about the plug-in channel.

13. The plug connector according to claim 12, wherein the at least two anvil arms and two anvil receptacles are configured such that with the achieving of the specific deformation of the receiving body, they simultaneously come into abutment contact by their respective contact section with their respective associated contact surfaces of the anvil receptacles.

14. The plug connector according to claim 12, wherein the anvil arms and anvil receptacles are configured such upon achieving at least two different specific deformations of the receiving body that differ by an extent of the displacing of the abutment surface of the receiving body against the plug-in direction, they successively come into abutment contact by their respective contact sections with their respective associated contact surfaces of the anvil receptacles, so that with the achieving of each specific elastic deformation of the receiving body a further resistance is respectively generated against the displacing of the abutment surface of the receiving body.

15. The plug connector according to claim 12, wherein at least one anvil arm is configured with its free end pointing in plug-in direction, and at least one anvil arm is configured with its free end pointing against the plug-in direction.

16. The plug connector according to claim 1, wherein that at least one anvil arm connected on both sides to the plate elements is configured at least one-side with the protrusion wherein the end, radially with respect to the plug-in channel, including the protrusion is connected by the connecting crosspiece to the plate element, and at least one further anvil arm connected on both sides to the plate elements is configured connected to the plate elements such that the contact section itself is configured as a part of the plate element.

17. The plug connector according to claim 1, wherein the plug-in channel of the receiving body has an axial plug clearance for the supporting of the plug part to be installed, wherein the plug clearance is limited by a rearmost, as viewed in the plug-in direction, stop for an annular bead of the plug part in the plug-in channel of the receiving body and the retaining part, disposed in front of the rearmost stop as viewed in the plug-in direction in locked position.

18. The plug connector according to claim 1, wherein the receiving body and/or the retaining part and/or the base body are configured monolithically.

19. The plug connector according to claim 1, wherein the receiving body and the base body are connected to each other in a material-bonded manner.

20. The plug connector according to claim 19, wherein the receiving body and the base body are joined together by a laser weld.

* * * * *